(12) United States Patent
Fuse

(10) Patent No.: US 6,532,099 B2
(45) Date of Patent: Mar. 11, 2003

(54) OPTICAL COMMUNICATIONS APPARATUS

(75) Inventor: Masaru Fuse, Toyonaka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 59 days.

(21) Appl. No.: 09/899,264

(22) Filed: Jul. 6, 2001

(65) Prior Publication Data

US 2002/0015210 A1 Feb. 7, 2002

(30) Foreign Application Priority Data

Jul. 7, 2000 (JP) ........................................ 2000-207174

(51) Int. Cl.[7] .............................. G02F 1/23; H04J 14/02
(52) U.S. Cl. ...................... 359/278; 359/125; 359/157; 359/181; 359/128
(58) Field of Search ................................ 359/125, 157, 359/181, 128, 278, 237, 238

(56) References Cited

U.S. PATENT DOCUMENTS 5,864,413 A * 1/1999 Feldman et al. ............ 359/125

OTHER PUBLICATIONS

"Hyperspace Addressed Optical Access Architecture Using Active Arrayed Waveguide Gratings", F. Farjaday, M.C. Parker, and S.D. Walker, OECC98, 15A2–2, pp. 316 and 317, 1998.

* cited by examiner

Primary Examiner—Hung Xuan Dang
Assistant Examiner—Tuyen Tra
(74) Attorney, Agent, or Firm—Wenderoth, Lind & Ponack, L.L.P.

(57) ABSTRACT

A large, high-speed optical communications apparatus is provided capable of selecting a signal transmission route in optical domain. An address extractor 101 extracts address information from data information included in a transmission signal. A variable frequency RF modulator 102 modulates the data information into an RF modulated signal having a predetermined frequency that corresponds to a lower address. A variable wavelength optical modulator 103 modulates the RF modulated signal into an optical signal having a predetermined wavelength that corresponds to an upper address. An optical router 105 outputs the optical signal according to the optical wavelength. A first RF optical router 1071 outputs the optical signal from a first or second output terminal provided thereto according to the RF modulating frequency. A second RF optical router 1072 operates similarly. First to fourth optical receivers 1091 to 1094 each converts the optical signal coming from the corresponding output terminal of the first or second RF optical router 1071, 1072 into an electrical signal.

8 Claims, 11 Drawing Sheets

F I G. 4 (a)
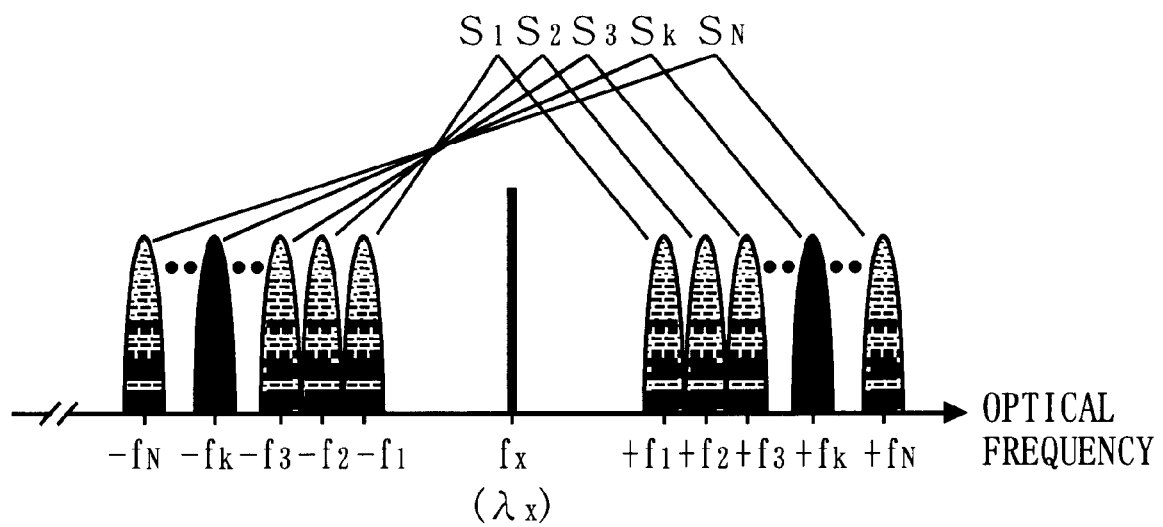
F I G. 4 (b)
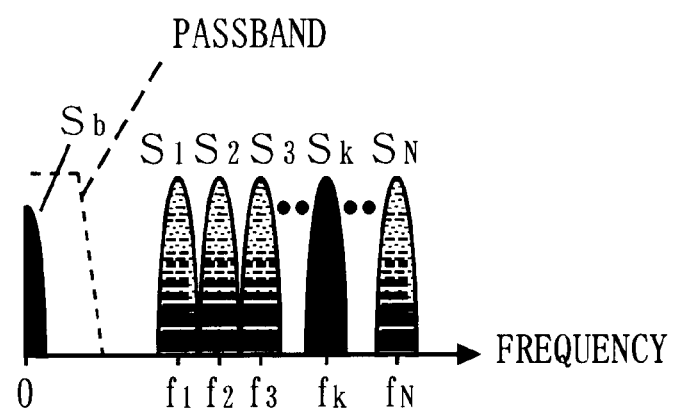

OPTICAL COMMUNICATIONS APPARATUS

BACKGROUND OF THE INVENTION

1. Field of the Invention

The present invention relates to optical communications apparatuses and, more specifically, to an optical communications apparatus for transmitting an optical signal by switching optical communications paths based on the wavelength and modulating frequency of the optical signal as address information.

2. Description of the Background Art

FIG. 10 is a block diagram showing the structure of a conventional optical communications apparatus. One example of such apparatus is disclosed in detail in "Hyperspace Addressed Optical Access Architecture using Active Arrayed Waveguide Gratings", F. Farjaday, M. C. Parker, and S. D. Walker, OECC98, 15A2-2, 1998.

In FIG. 10, the optical communications apparatus includes an optical transmitting circuit 10001, a main optical transmission path 1004, an optical router 1005, first and second distribution optical transmission paths 10061 and 10062, and first and second optical receiving circuits 10091 and 10092. The optical transmitting circuit 10001 includes an address extractor 1010 and a variable wavelength optical modulator 1003.

In the above structured optical communications apparatus, the address extractor 1010 extracts, from a signal received by the optical transmitting circuit 10001, address information indicating the destination to which the signal should go. Alternatively, the address extractor 1010 may be provided with the address information itself separately.

The variable wavelength optical modulator 1003 is composed of a variable wavelength light source capable of changing the wavelength of output light. This wavelength is uniquely determined based on the address information extracted by the address information extractor 1010 or separately provided. The variable wavelength optical modulator 1003 optically modulates the signal including the above described data information, and then sends out light having the determined wavelength to the main optical transmission path 1004.

The optical router 1005, exemplarily composed of an AWG (Arrayed WaveGuide), has a plurality of output terminals (in this example, first and second output terminals 10051 and 10052) for selectively outputting the optical signal based on the wavelength of the input light. When supplied with the optical signal through the main optical transmission path 1004, the optical router 1005 outputs it from the first terminal 10051 when the optical wavelength thereof is λ1, while outputting from the second terminal 10052 when λ2.

The first and second optical receiving circuits 10091 and 10092 are each connected to the optical router 1005 at the first output terminal 10051 and at the second output terminal 10052, respectively. The first and second optical receiving circuits 10091 and 10092 each convert the optical signal from each corresponding output terminal into an electrical signal for output.

As described above, in the conventional optical communications apparatus, a variable wavelength light source is used as the light source in the optical transmitting circuit to control the wavelength of the output light based on the address information indicating the destination to which the data information should go. Also, the optical router is provided on the optical transmission path, enabling routing of the input light for output from each different terminal based on the wavelength thereof. Thus, the conventional optical communications apparatus can carry out autonomous switching among the transmission paths in optical domain, and therefore a high-speed optical communications network can be achieved.

One disadvantage here is, when the wavelength of the optical signal is used as an address, the number of wavelengths or wavelength bands available on the optical transmission path is limited. This disadvantage is described below with reference to FIG. 11.

FIG. 11 is a schematic diagram demonstrating the limitation of the number of wavelengths in the conventional optical communications apparatus. Specifically, as shown in FIG. 11, Erbium-doped fiber optical amplifiers (EDFA) widely used in optical transmission systems can generally carry out amplification only within approximately 30 to 40 nm in a wavelength band of 1.55 $\mu$m. On the other hand, AWGs and optical filters generally have a wavelength resolving power (dividable optical wavelength period) of approximately 0.8 nm. In FIG. 11, the band pass characteristics of the optical filter is represented as a dotted line. Consequently, the number of wavelengths available in address space is very limited, approximately 40 to 50. Thus, in the conventional optical communications apparatus, the number of optical receiving terminals that can be connected thereto or covered thereby (the number of subscribers) is disadvantageously limited, and a large optical communications network cannot be constructed.

In order to construct a large optical communications network using the conventional optical communications apparatus, one structure can be suggested, where further routing is made using electrical signals outputted from the first and second optical receiving circuits 10091 and 10092 for transmitting information to end receiving terminals (subscribers). In such structure, however, unauthorized information extraction and tampering are highly possible due to the use of the electrical signals for information transmission to the end receiving terminals (subscribers), compared to the case where optical signals are used. Also, conventional communications networks using electrical signals are inferior, in transmission speed and amount of transmittable information, to optical communications networks using optical signals for transmitting information up to end users.

SUMMARY OF THE INVENTION

Therefore, an object of the present invention is to provide an optical communications apparatus achieving a large optical communications network with high speed and security by using the wavelength of an optical signal as an address for switching among transmission paths in optical domain.

The present invention has the following features to achieve the object above.

A first aspect of the present invention is directed to an optical communications apparatus for optically transmitting a transmission signal including data information a destination, and the apparatus includes:

a variable frequency RF modulator for modulating the transmission signal into an RF modulated signal, with a predetermined carrier frequency that corresponds to a lower address of address information uniquely set to the destination, the lower address representing the destination in a predetermined group to which the destination belongs;

a variable wavelength optical modulator for modulating the RF modulated signal outputted from the variable frequency RF modulator into an optical signal, with a predetermined optical wavelength that corresponds to an upper address of the address information, the upper address representing the predetermined group to which the destination belongs;

an optical router provided with a plurality of output terminals, for selectively outputting the optical signal outputted from the variable wavelength optical modulator from one of the output terminals that corresponds to the wavelength of the optical signal;

a plurality of RF optical routers each provided with a plurality of output terminals, for selectively outputting the optical signal coming from the output terminal of the optical router from one of the output terminals that corresponds to the carrier frequency of the RF modulated signal on the optical signal; and a plurality of optical receiving circuits each for converting the optical signal outputted from the corresponding output terminal of the RF optical router into an electrical signal that corresponds to the transmission signal.

In the first aspect, by using the structure capable of selecting a signal transmission route in optical domain for switching (routing), the optical wavelength is related to the upper address of the address information indicative of the signal destination, and the (carrier) frequency of the RF modulated signal is related to the lower address. Based on the optical wavelength, a first optical routing is carried out, and then, based on the RF modulating frequency, a second optical routing is carried out. Thus, a large-capacity, high-speed optical communications apparatus capable of covering more optical receiving terminals can be achieved.

According to a second aspect, in the first aspect, the apparatus further includes an address extractor for extracting the address information from the transmission signal including the address information, and outputting the lower address to the variable frequency RF modulator and the upper address to the variable wavelength optical modulator In the second aspect, the transmission signal further includes address information in addition to data information. Therefore, by extracting the address information from the transmission signal for optical routing, the optical communications apparatus does not have to be separately supplied with the address information.

According to a third aspect, in the first aspect, the variable frequency RF modulator is plurally provided, each converting the transmission signal to a different destination into the RF modulated signal with different carrier frequency, the variable wavelength optical modulator is plurally provided, each converting the RF modulated signal outputted from the corresponding variable frequency RF modulator into the optical signal, and the optical router is supplied with the optical signals from all variable wavelength optical modulators as being multiplexed.

In the third aspect, optical signals coming from a plurality of optical transmitting circuits are multiplexed, and in the optical spectrum of the multiplexed optical signal, a transmission route is selected based first on the optical wavelength, and then on the RF modulating frequency. Thus, the optical transmission path is more efficiently used, and a high-speed, large-capacity optical multiplex communications apparatus can be achieved.

According to a fourth aspect, in the first aspect, the variable wavelength optical modulator carries out optical intensity modulation, the variable frequency RF modulator carries out ASK (Amplitude Shift Keying) modulation, each of the RF optical routers includes:
an optical brancher for outputting the optical signal from a plurality of output terminals; and
a plurality of optical modulators each for subjecting the optical signal outputted from the corresponding output terminal of the optical brancher to optical intensity modulation with a signal having a frequency equal to the carrier the predetermined frequency of the RF modulated signal, and each of the optical receivers includes:
a square-law-detector for carrying out square-law-detection on the optical signal outputted from the corresponding RF optical router, and outputting an electrical signal; and
a filter for passing a predetermined low frequency component of the electrical signal outputted from the square-law-detector, and outputting baseband information of the RF modulated signal.

In the fourth aspect, optical intensity modulation is used as the optical modulation scheme, and ASK modulation is used as the RF modulation scheme. The optical signal is modulated with the frequency corresponding to the RF modulated signal to be extracted, square-detected by the optical receiving terminal, and then baseband information of the RF modulated signal is reproduced for routing in the optical domain based on the RF modulated frequency. Thus, a larger, higher-speed optical communications apparatus can be achieved.

According to a fifth aspect, in the first aspect, the variable wavelength optical modulator carries out optical intensity modulation, each of the RF optical routers includes:
an optical brancher for outputting the optical signal from a plurality of output terminals; and
a plurality of optical filters each for extracting, from the optical signal outputted from the corresponding output terminal of the optical brancher, an optical carrier component and a double sideband component corresponding to the predetermined frequency of the RF modulated signal, and each of the optical receivers includes:
a square-law-detector for carrying out square-law-detection on the optical signal outputted from the corresponding RF optical router, and outputting the RF modulated signal.

In the fifth aspect, optical intensity modulation is used as the optical modulation scheme. From the optical signal, the optical carrier component and the double sideband component corresponding to the RF modulated signal to be extracted is passed and extracted, square-detected by the optical receiving terminal, and then the RF modulated signal is reproduced for routing in the optical domain based on the RF modulated frequency. Thus, a larger, higher-speed optical communications apparatus can be achieved.

According to a sixth aspect, in the first aspect, the variable wavelength optical modulator carries out optical intensity modulation, each of the RF optical routers includes:
an optical brancher for outputting the optical signal from a plurality of output terminals; and
a plurality of optical filters each for extracting, from the optical signal outputted from the corresponding output terminal of the optical brancher, double sideband components corresponding to the predetermined frequency of the RF modulated signal, and each of the optical receivers includes:
a square-law-detector for carrying out square-law-detection on the optical signal outputted from the corresponding RF optical router, and outputting a signal component that is a multiplied component of the RF modulated signal.

In the sixth aspect, optical intensity modulation is used as the optical modulation scheme. From the optical signal, the double sideband components corresponding to the RF modulated signal to be extracted are passed and extracted, square-detected by the optical receiving terminal, and then the RF modulated signal is reproduced for routing in the optical domain based on the RF modulated frequency. Thus, a larger, higher-speed optical communications apparatus can be achieved.

According to a seventh aspect, in the first aspect, the variable wavelength optical modulator carries out optical frequency modulation, each of the RF optical routers includes:
an optical brancher for outputting the optical signal from a plurality of output terminals; and
a plurality of optical filters each for suppressing, on the optical signal outputted from the corresponding output terminal of the optical brancher, any one of an upper sideband component and a lower sideband component corresponding to the predetermined frequency of the RF modulated signal, and each of the optical receivers includes:
a square-law-detector for carrying out square-law-detection on the optical signal outputted from the corresponding RF optical router, and outputting the RF modulated signal.

In the seventh aspect, optical intensity modulation is used as the optical modulation scheme. In the optical signal, any one of the double sidebands corresponding to the RF modulated signal to be extracted is suppressed. Then, the optical signal is square-detected by the optical receiving terminal, and then the RF modulated signal is reproduced for routing in the optical domain based on the RF modulated frequency. Thus, a larger, higher-speed optical communications apparatus can be achieved.

An eighth aspect of the present invention is directed to an optical communications method for optically transmitting a transmission signal including data information to a destination, and the method includes:

a variable frequency RF modulating step of modulating the transmission signal into an RF modulated signal with a predetermined carrier frequency that uniquely corresponds to the destination in a predetermined group to which the destination belongs;

a variable wavelength optical modulating step of modulating the RF modulated signal outputted from the variable frequency RF modulator into an optical signal with a predetermined optical wavelength that uniquely corresponds to the predetermined group to which the destination belongs;

an optical routing step of selecting a distribution route corresponding to the wavelength of the optical signal converted in the variable wavelength optical modulating step, and outputting the optical signal to the distribution route;

an RF optical routing step of selecting an end route corresponding to the carrier frequency of the RF modulated signal of the optical signal outputted in the optical routing step, and outputting the optical signal to the end route; and an optical receiving step of converting the optical signal outputted in the RF optical routing step into an electrical signal that corresponds to the transmission signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic diagram demonstrating the operational principle of optical routing based on the RF modulated signal under the first example of structure of the optical communications apparatus according to the first embodiment of the present invention;

DESCRIPTION OF THE PREFERRED EMBODIMENTS (First embodiment)

Figure 1:
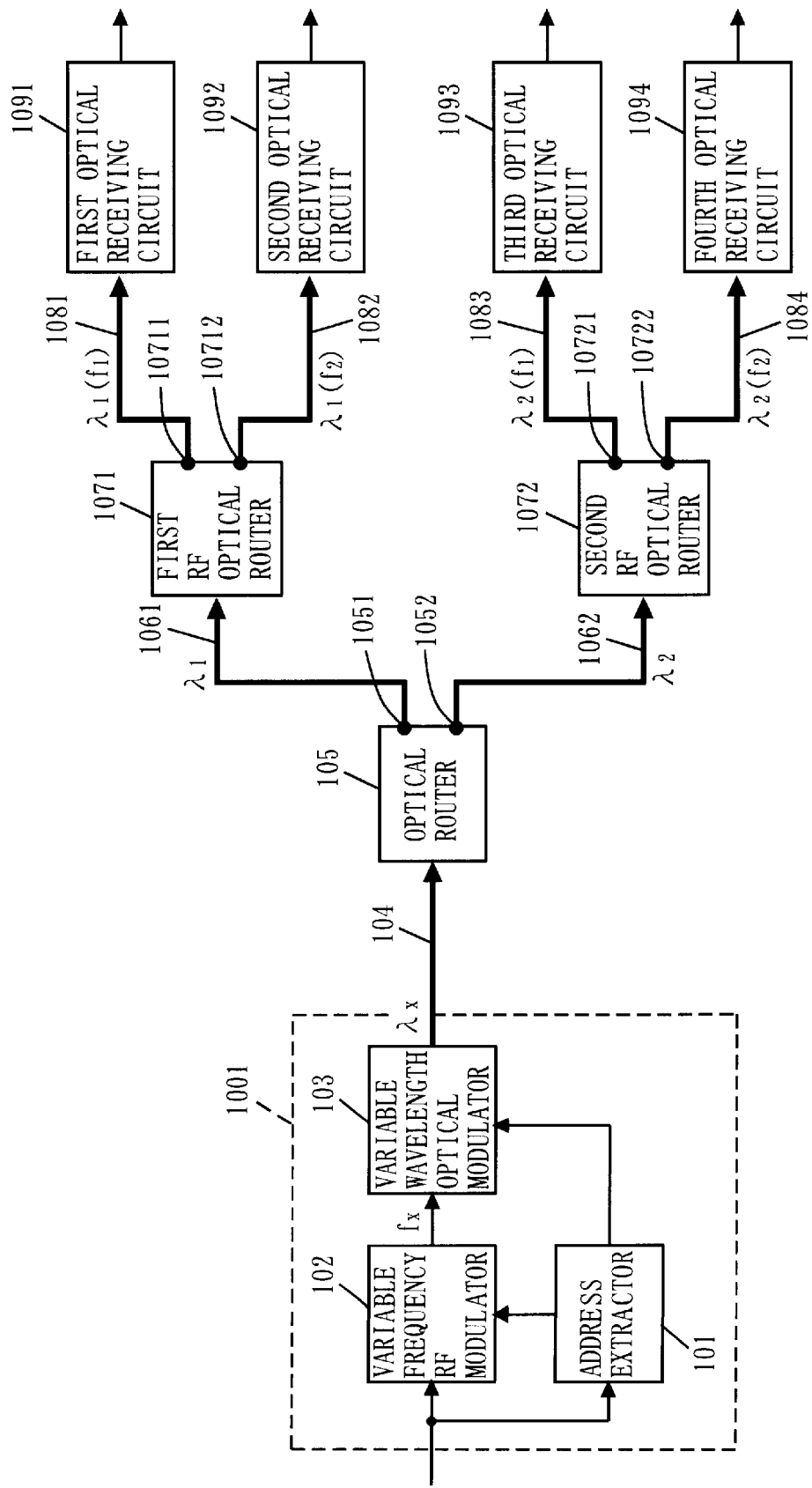
FIG. 1 is a block diagram showing the structure of an optical communications apparatus according to a first embodiment of the present invention.

With reference to FIG. 1, an optical communications apparatus according to a first embodiment of the present invention is described below. As shown in FIG. 1, the optical communications apparatus realizes communications between one transmitting circuit and four main optical receiving circuits. Specifically, the optical communications apparatus includes an optical transmitting circuit 1001; a main optical transmission path 104; an optical router 105; first and second distribution optical transmission paths 1061 and 1062; first and second RF optical routers 1071 and 1072; first, second, third, and fourth end optical transmission paths 1081, 1082, 1083, and 1084; and first, second third and fourth optical receiving circuits 1091, 1092, 1093, and 1094. Furthermore, the optical transmitting circuit 1001 includes an address extractor 101, a variable frequency RF modulator 102, and a variable wavelength optical modulator 103.

Next, the operation of the optical communications apparatus illustrated in FIG. 1 is described. The address extractor 101 extracts, from data information supplied to the optical transmitting circuit 1001, address information indicating the destination of the data information. Alternatively, the address extractor 101 may be supplied with the address information separately from the data information.

The variable frequency RF modulator 102 modulates the data information into an RF modulated signal with a carrier having a frequency uniquely determined corresponding to all or part of the address information supplied by the address extractor 101. Such RF modulated signal is typified by a digital signal modulated with a modulation scheme such as PSK or ASK.

The variable wavelength optical modulator 103 modulates the RF modulated signal received from the variable frequency RF modulator 102 with light with its wavelength set to a predetermined one corresponding to all or part of the address information supplied by the address extractor 101. Then, the variable wavelength optical modulator 103 sends out the resultant optical modulated signal to the main optical transmission path 104.

Here, the relation between the address information and the optical wavelength and RF modulating frequency of the transmission signal is more specifically described. Assume herein that the address information extracted by the address extractor 101 is six bits, represented as "A5, A4, A3, A2, A1, A0". A5 is a most significant bit (MSB), and A0 is a least significant bit (LSB). Upper three bits including the MSB (A5, A4, and A3) represent an upper address indicative of a general group to which the destination of the data information belongs and that covers a larger area. On the other hand, lower three including the LSB (A2, A1, and A0) represent a lower address indicative of a specific group that covers a smaller area, or an individual destination itself.

Here, the variable wavelength optical modulator 103 sets the wavelength of the optical signal based on the upper address, while the variable frequency RF modulator 102 sets the carrier frequency of the RF modulated signal based on the lower address. Thus, the optical signal can be routed through a general group based on the upper address, and then transmitted to a specific group or directly to a destination based on the lower address.

The optical router 105 is supplied with the optical signal coming through the main optical transmission path 104. When the optical wavelength of the received optical signal is a wavelength λ1, the optical router 105 sends out the optical signal from a first output terminal 1051 to the first distribution optical transmission path 1061. When the optical wavelength thereof is a wavelength λ2, the optical router 105 sends out the optical signal from a second output terminal 1052 to the second distribution optical transmission path 1062.

The first RF optical router 1071 is provided correspondingly to the first output terminal 1051 of the optical router 105. The first RF optical router 1071 receives the optical signal coming through the first distribution optical transmission path 1061. When the RF modulating frequency of the received optical signal is a first frequency f1, the first RF optical router 1071 sends out the optical signal from a first output terminal 10711 to the first end optical transmission path 1081. When the RF modulating frequency thereof is a second frequency f2, the first RF optical router 1071 sends out the optical signal from a second output terminal 10712 to the second end optical transmission path 1082.

Similarly, the second RF optical router 1072 is provided correspondingly to the second output terminal 1052 of the optical router 105. The second RF optical router 1072 receives the optical signal coming through the second distribution optical transmission path 1062. When the RF modulating frequency of the received optical signal is the first frequency f1, the second RF optical router 1072 sends out the optical signal from a first output terminal 10721 to the third end optical transmission path 1083. When the RF modulating frequency thereof is the second frequency f2, the second RF optical router 1072 sends out the optical signal from a second output terminal 10722 to the fourth end optical transmission path 1084.

The first to fourth optical receiving circuits 1091 to 1094 are respectively connected to the first to fourth end optical transmission paths 1081 to 1084, each carrying out square-law-detection on the optical signal received through the corresponding optical transmission path for conversion into an electrical signal, and then outputting the electrical signal.

Figure 2:
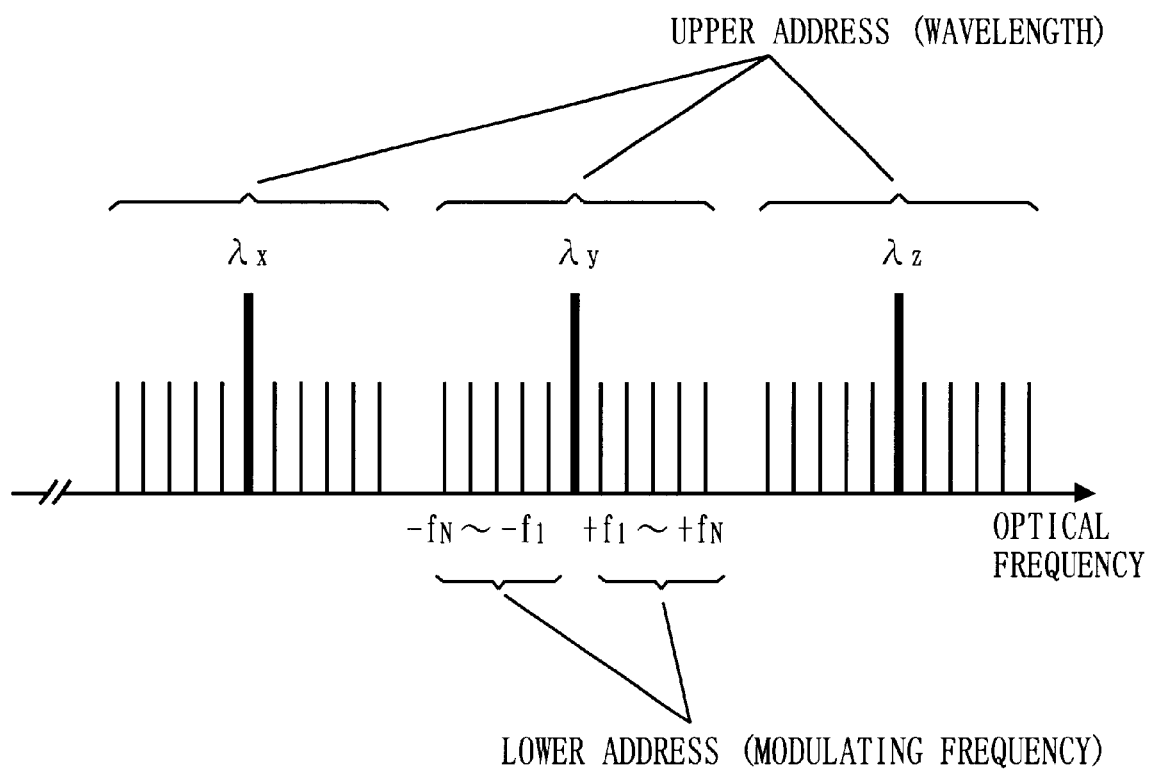
FIG. 2 is a schematic diagram for demonstrating arrangement of the wavelengths of an optical signal and RF modulating frequencies in the first embodiment of the present invention.

As such, in the present optical communications apparatus, switching of the transmission routes is carried out as shown in FIG. 2. That is, in the optical spectrum of the optical signal generated by wavelength-multiplexing the optical signals each modulated with the RF modulated signal, the switching is carried out based on optical wavelengths fx, fy, and fz as the upper address, and then based on optical wavelengths f1, f2, and f3 as the lower address. Thus, compared with the optical routing only based on the optical wavelength, more address space can be ensured. Therefore, the optical communications apparatus can be so achieved as to have a large capacity and cover more subscribers.

Figure 3:
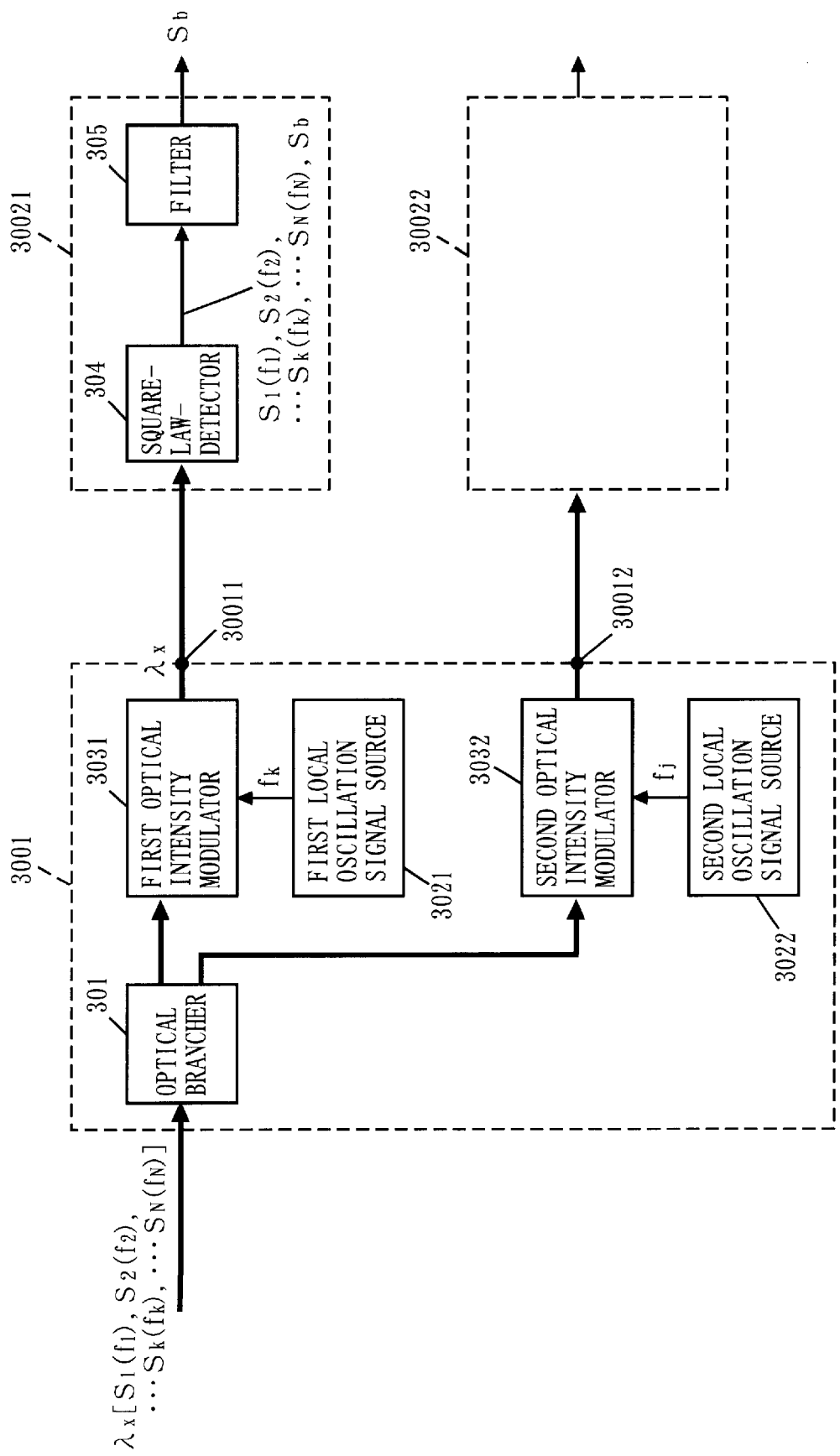
FIG. 3 is a block diagram showing a first example of structure of RF optical routers and optical receiving circuits in the optical communications apparatus according to the first embodiment of the present invention.

Next, with reference to FIGS. 3 and 4, a first example of structure and operation of the RF optical router and the optical receiving circuits is described in detail. FIG. 3 is a diagram specifically illustrating the first example of structure of the RF optical routers (the first and second RF optical routers 1071 and 1072 in FIG. 1) and the optical receiving circuits (the first, second, third, and fourth optical receiving circuits 1091, 1092, 1093, and 1094 in FIG. 1).

In FIG. 3, an RF optical router 3001 includes an optical brancher 301, first and second local oscillation signal sources 3021 and 3022, and first and second optical intensity modulators 3031 and 3032. A first optical receiving circuit 30021 includes a square-law-detector 304 and a filter 305. A second optical receiving circuit 30022 is similar in structure to the first optical receiving circuit 30021, and therefore not illustrated in detail.

Next, the operation of the RF optical routers and the optical receiving circuits shown in FIG. 3 is described. Assume herein that ASK (Amplitude Shift Keying) modulation is used as the RF modulation scheme applied to the optical signal outputted from the optical transmitting circuit and inputted to the RF optical router 3001.

Figure 5:
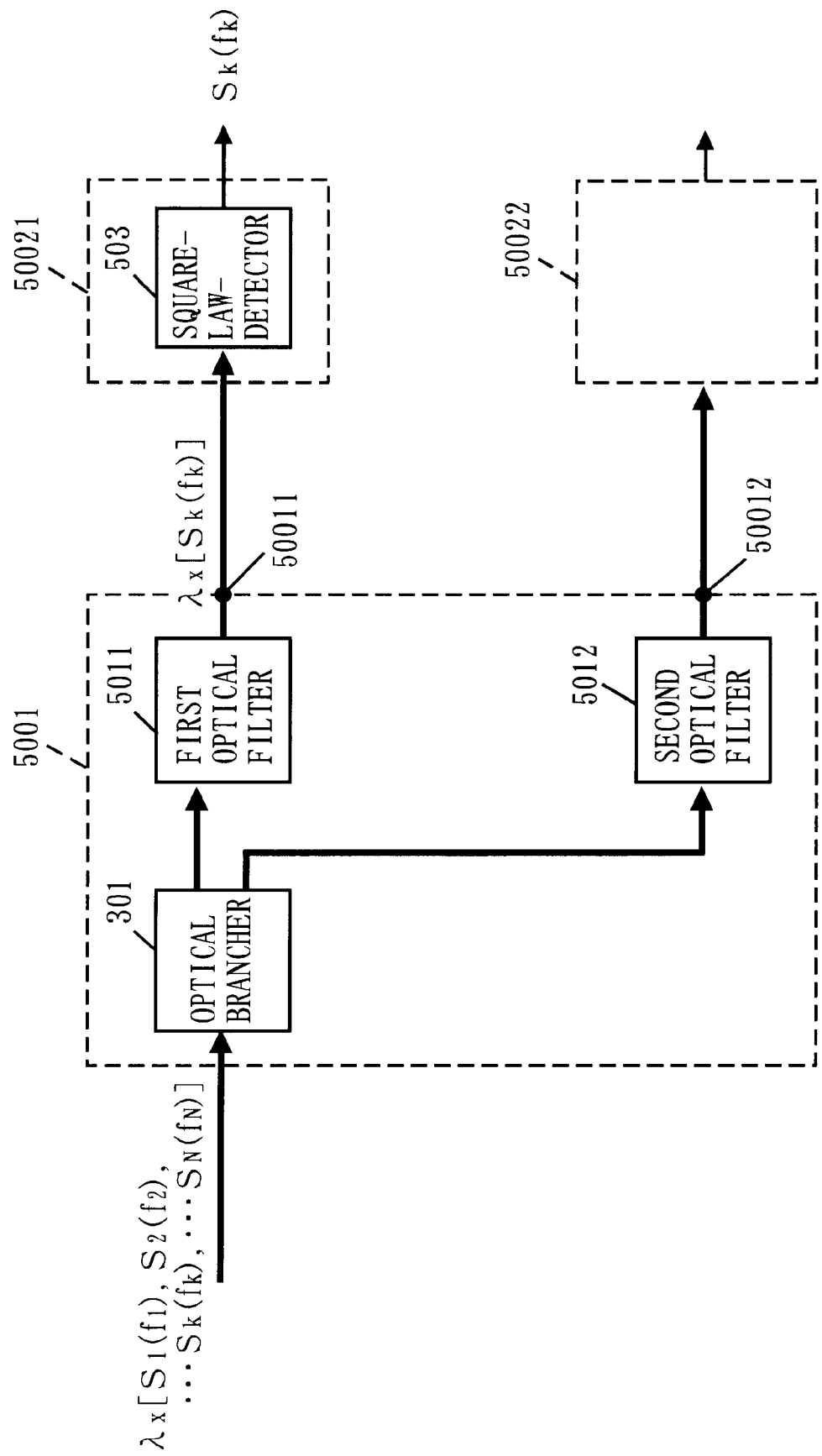
FIG. 5 is a block diagram showing a second example of structure of the RF optical routers and the optical receiving circuits in the optical communications apparatus according the first embodiment of the present invention.

Also assume that the optical signal supplied to the RF optical router 3001 is a signal obtained by multiplexing a plurality of RF modulated signals S1, S2, S3, . . . , Sk, . . . , SN with different carrier frequencies. Note that, in (a) of FIG. 4, −fN to +fN representing optical frequencies indicate how much an optical carrier frequency fx is increased or decreased. Therefore, the optical frequencies −fN to +fN are respectively equivalent to optical frequencies fx−fN to fx+fN. In FIG. 5, this optical signal is represented as fx[S1(f1), S2(f2), . . . , Sk(fk), . . . , SN(fN)].

In the present optical communications apparatus, when only one RF modulated signal is used, such state cannot be observed as that a plurality of RF modulated signals are frequency-multiplexed as stated above. The above state may occur, however, if the variable frequency RF modulator 102 uses a plurality of RF modulated signals. Therefore, for convenience in description, assume that the optical signal supplied to the RF optical router 3001 is a signal obtained by multiplexing a plurality of RF modulated signals.

The optical brancher 301 in the RF optical router 3001 branches the input optical signal for output. The first local oscillation signal source 3021 outputs a first local oscillation signal Lk having a frequency fk equal to the frequency of the RF modulated signal Sk of the optical signal outputted from a first output terminal 30011 of the RF optical router 3001. With this first local oscillation signal Lk, the first optical intensity modulator 3031 modulates one optical signal branched by the optical brancher 301 for optical intensity modulation. The optical signal after optical intensity modulation is outputted from the first output terminal 30011 of the RF optical router 3001.

Similarly, the second local oscillation signal source 3022 outputs a second local oscillation signal Lj having a frequency fj equal to the frequency of the RF modulated signal Sj of the optical signal outputted from a second output terminal 30012 of the RF optical router 3001. With second first local oscillation signal Lj, the second optical intensity modulator 3032 modulates the other optical signal branched by the optical brancher 301 for optical intensity modulation. The optical signal after optical intensity modulation is outputted from the second output terminal 30012 of the RF optical router 3001.

The first optical receiving circuit 30021 is connected to the first output terminal 30011 of the RF optical router 3001. The first optical receiving circuit 30021 carries out square-law-detection on the optical signal outputted from that terminal, demodulates the desired RF modulated signal Sk in the optical signal, reproduces baseband information Sb corresponding thereto, and outputs a baseband signal. Such reproduction of the baseband signal is possible because the RF modulated signal Sk to be demodulated is a signal modulated by the ASK modulation technique.

The filter 305 passes only the baseband information Sb, and eliminates the other unwanted components for output. A frequency spectrum of the signal outputted from the square-law-detector 304 is illustrated in (b) of FIG. 4, where a passband of the filter 305 is enclosed by a dotted line. As can be seen from the drawing, only the baseband information Sb is passed by the filter 305 for output.

The above described operation is further explained by using equations. An electric field Ein(t) of the optical signal supplied to the first optical intensity modulator 3031 can be represented by the following equation (1), $$E_{in}(t) = A\sqrt{\{S_{b1}C_{0S}(2\pi f_1 t) + \ldots + S_{bk}(C_{0S}(2\pi f_k t) + \ldots + S_{bN}C_{0S}(2\pi f_N t)\} \times C_{0S}(2\pi f_x t)} \quad (1)$$

where A is an electric field amplitude, fx is an optical frequency (optical wavelength), f1, . . . , fk, . . . , and fN are RF modulating frequencies, Sb1, . . . , Sbk, . . . , and SbN are levels ("1" or "0") of RF modulated signals (ASK modulated signals).

The first optical intensity modulator 3031 intensity-modulates the optical signal with the local oscillation signal (sine wave) having the frequency fk equivalent to the frequency of the ASK modulated signal to be extracted, and outputs an optical signal Eout(t) represented as the following equation (2).

$$\begin{aligned}E_{out}(t) &= A\sqrt{\{S_{b1}C_{0S}(2\pi f_1 t) + \ldots + S_{bk}(C_{0S}(2\pi f_k t) + \ldots + S_{bN}C_{0S}(2\pi f_N t)\} \cdot C_{0S}(2\pi f_k t) \times C_{0S}(2\pi f_x t)} \\ &= A\sqrt{\begin{aligned}\{&S_{b1}C_{0S}(2\pi f_1 t) \cdot C_{0S}(2\pi f_k t) + \ldots + \\ &S_{bk}C_{0S}(2\pi f_k t) \cdot C_{0S}(2\pi f_k t) + \ldots + \\ &S_{bN}C_{0S}(2\pi f_N t) \cdot C_{0S}(2\pi f_k t)\} \times \\ &C_{0S}(2\pi f_x t)\end{aligned}}\end{aligned} \quad (2)$$

The square-law-detector 304 carries out square-law-detection on the optical signal for conversion into an optical current for output. In this optical current, only a component Ir(t) is extracted as represented by the following equation (3), which corresponds to the second term in the above equation (2), $$\begin{aligned}Ir(t) &= RA^2 S_{bk} C_{0S}(2\pi f_k t) \cdot C_{0S}(2\pi f_k t) \\ &= \frac{RA^2 S_{bk}}{2}\{1 + C_{0S}(4\pi f_k t)\}\end{aligned} \quad (3)$$

where R is optical-electrical conversion efficiency.

Here, the first term in the above equation (3) is equal to the baseband information Sb of the ASK modulated signal Sk. Therefore, if unwanted components are eliminated by the filter 305, only the baseband information of the desired ASK modulated signal can be extracted.

Figure 6:
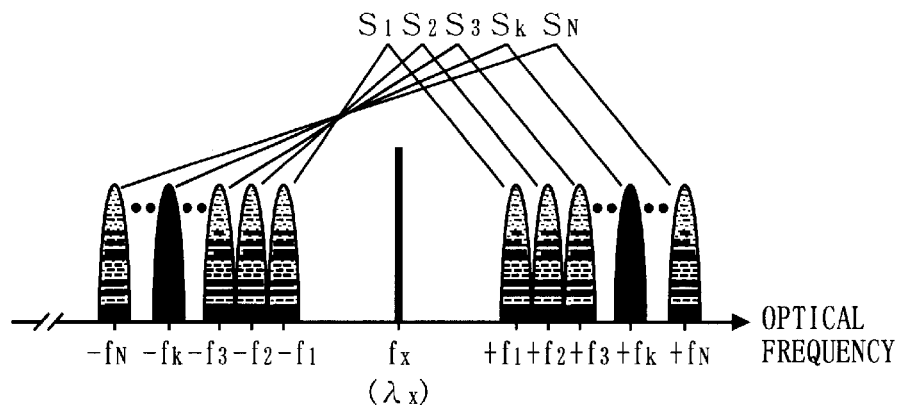
FIG. 6 is a schematic diagram demonstrating the operational principle of optical routing based on the RF modulated signal under the second example of structure of the optical communications apparatus according to the first embodiment of the present invention.
Figure 6:
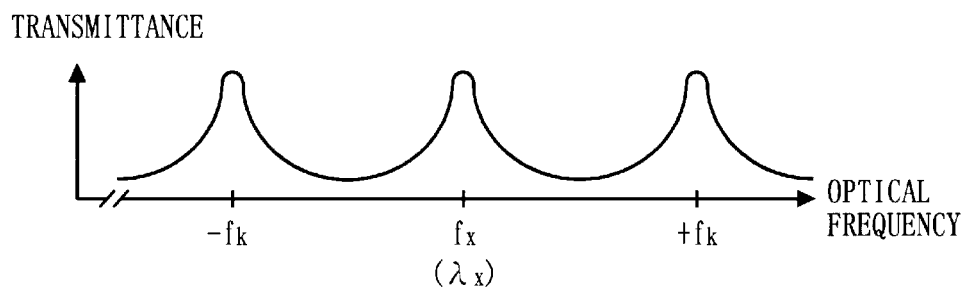
Figure 6:
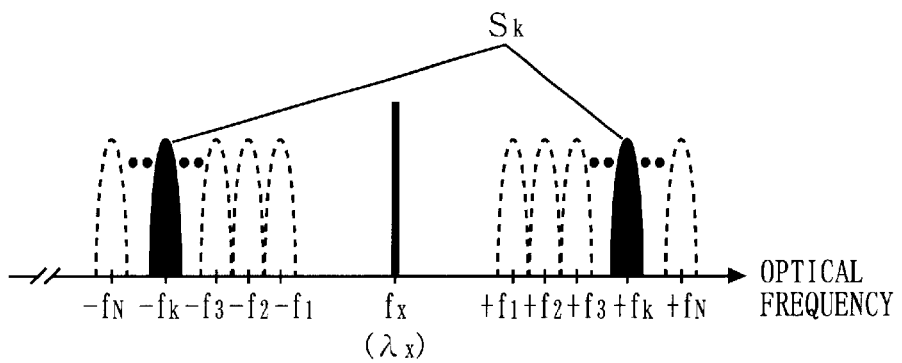
Figure 6:
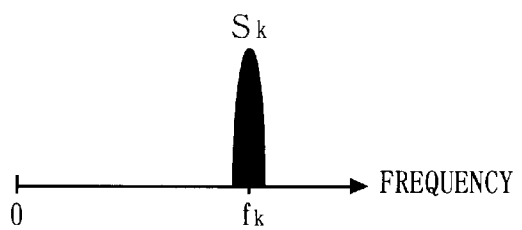

Next, with reference to FIGS. 5 and 6, a second example of structure of the RF optical routers and the optical receiving circuits in the present optical communications apparatus is described. FIG. 5 is a diagram specifically illustrating the second example of structure of the RF optical routers (the first and second RF optical routers 1071 and 1072 in FIG. 1) and the optical receiving circuits (the first, second, third, and fourth optical receiving circuits 1091, 1092, 1093, and 1094 in FIG. 1).

In FIG. 5, an RF optical router 5001 includes the optical brancher 301, and first and second optical filters 5011 and 5012. A first optical receiving circuit 50021 includes a square-law-detector 503. A second optical receiving circuit 50022 is similar in structure to the first optical receiving circuit 50021, and therefore not illustrated in detail.

Next, the operation of the RF optical routers and the optical receiving circuits shown in FIG. 5 is described. Here, as shown in (a) of FIG. 6, the optical signal outputted from the optical transmitting circuit to the RF optical router 5001 is a signal obtained by multiplexing a plurality of RF modulated signals S1, S2, S3, . . . , Sk, . . . , SN with different carrier frequencies. In FIG. 5, this signal is represented as λx[S1(f1), S2(f2), . . . , Sk(fk), . . . , SN(fN)].

The optical brancher 301 provided in the RF optical router 5001 branches the input optical signal for output. The first optical filter 5011 can pass only desired optical frequency components. Illustrated in (b) of FIG. 6 is such an example of transmittance characteristics of the first optical filter 5011. As shown in the drawing, peaks of transmittance appear at the optical frequencies fx, fx+fk, and fx−fk.

With such characteristics, when supplied with one optical signal branched by the optical brancher 301 as shown in (a) of FIG. 6, the first optical filter 5011 passes only the optical carrier component and double sideband components of the RF modulated signal Sk for output from a first output terminal 50011 of the RF optical router 5001. The spectrum of the optical signal outputted from the first output terminal 50011 is illustrated in (c) of FIG. 6. As can been seen from the drawing, optical frequency components represented by dotted lines are suppressed by the first optical filter 5011.

Similarly, when supplied with the other optical signal branched by the optical brancher 301, the second optical filter 5012 passes only the optical carrier component and double sideband components of the RF modulated signal Sj for output from a second output terminal 50012 of the RF optical router 5001.

The first optical receiving circuit 50021 is connected to the first output terminal 50011 of the RF optical router 5001, and carries out square-law-detection on the optical signal received therefrom for reproducing and outputting the desired RF modulated signal.

Figure 7:
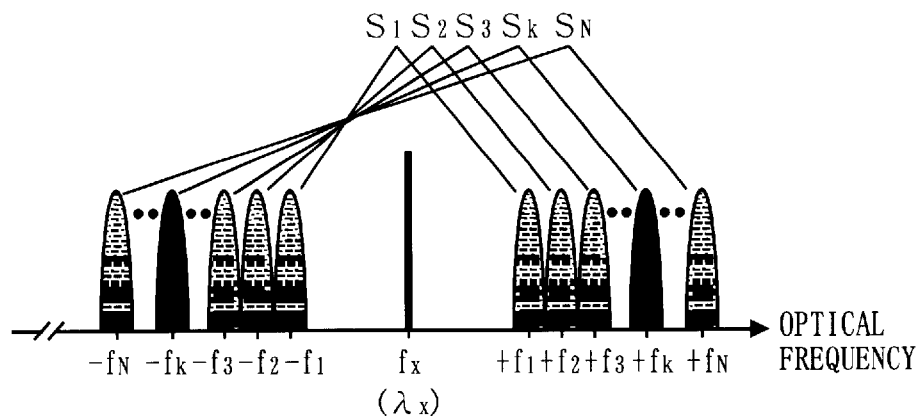
FIG. 7 is a schematic diagram demonstrating the operational principle of optical routing based on the RF modulated signal under a third example of structure of the RF optical routers and the optical receiving circuits in the optical communications apparatus according to the first embodiment of the present invention.
Figure 7:
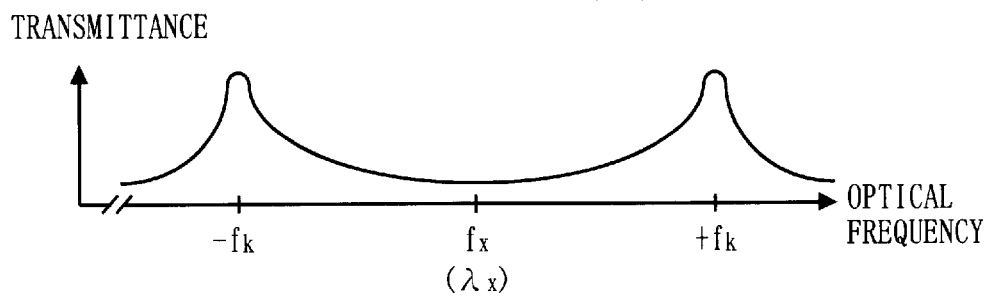
Figure 7:
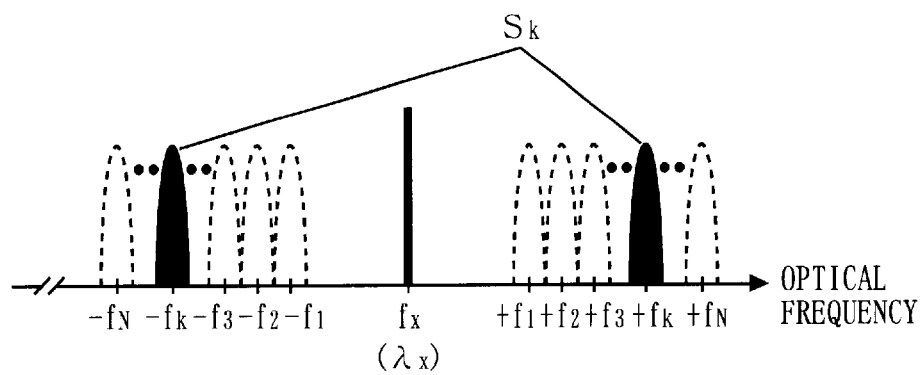
Figure 7:

Next, with reference to FIG. 7, a third example of structure of the RF optical routers and the optical receiving circuits in the present optical communications apparatus is described. Here, the third example is the same in structure as the second example shown in FIG. 5, but different therefrom in transmittance characteristics of the optical filters (the first and second optical filters 5011 and 5012).

The first optical filter 5011 can pass only a desired optical frequency component. Illustrated in (b) of FIG. 7 is one example of such transmittance characteristics of the first optical filter 5011. As shown in the drawing, peaks of transmittance appear at the optical frequencies fx+fk and fx−fk. Therefore, the optical frequency interval between the peaks of transmittance shown in (b) of FIG. 7 is twice wider than that shown in (b) of FIG. 6. Thus, the first optical filter 5011 is easier to fabricate, compared with that of the second example requiring high accuracy.

With such characteristics, when supplied with one optical signal branched by the optical brancher 301 as shown in (a) of FIG. 7, the first optical filter 5011 passes only double sideband components of the RF modulated signal Sk for output from the first output terminal 50011 of the RF optical router 5001. The spectrum of the optical signal outputted from the first output terminal 50011 is illustrated in (c) of FIG. 7.

Similarly, when supplied with the other optical signal branched by the optical brancher 301, the second optical filter 5012 passes only double sideband components of the RF modulated signal Sj for output from the second output terminal 50012 of the RF optical router 5001.

The first optical receiving circuit 50021 is connected to the first output terminal 50011 of the RF optical router 5001, and carries out square-law-detection on the optical signal received therefrom for reproducing and outputting a multiplied (doubled) component Sk' (frequency 2 fk) of the desired RF modulated signal. The frequency spectrum of the optical signal outputted from the first optical receiving circuit 50021 is illustrated in (d) of FIG. 7. As shown in the drawing, the RF modulated signal Sk is reproduced as a beat signal having the frequency 2 fk.

Figure 8:
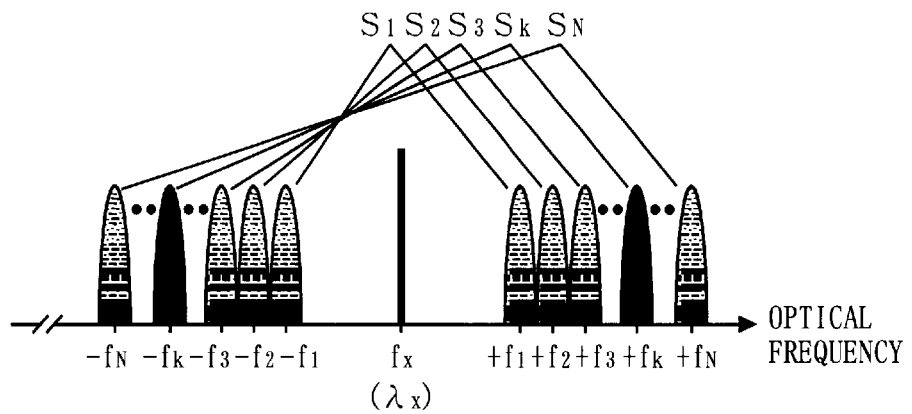
FIG. 8 is a schematic diagram demonstrating the operational principle of optical routing based on the RF modulated signal under a fourth example of structure of the RF optical routers and the optical receiving circuits in the optical communications apparatus according to the first embodiment of the present invention.
Figure 8:
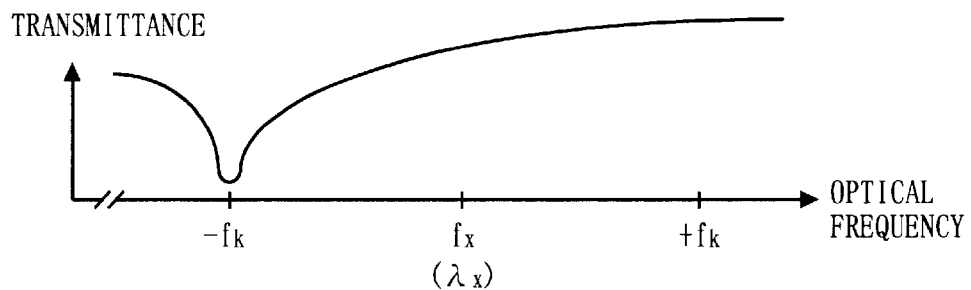
Figure 8:
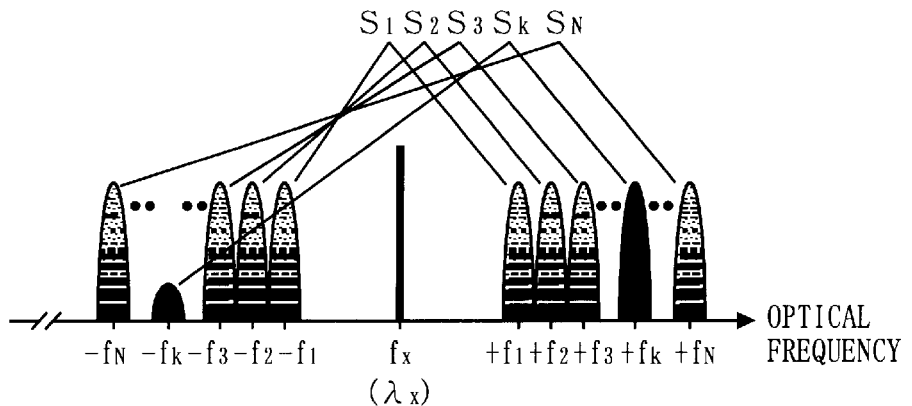
Figure 8:
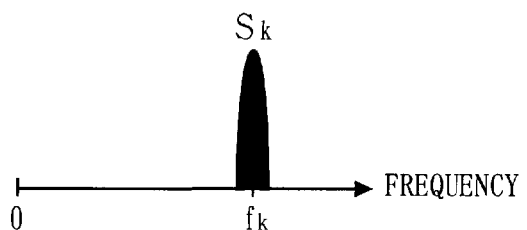

Next, with reference to FIG. 8, a fourth example of structure of the RF optical routers and the optical receiving circuits in the present optical communications apparatus is described. Here, the fourth example is also the same in structure as the second example shown in FIG. 5, but different therefrom in transmittance characteristics of the optical filters (the first and second optical filters 5011 and 5012). Furthermore, the variable wavelength optical modulator 103 in the fourth example carries out optical frequency modulation.

The first optical filter 5011 can pass only a desired optical frequency component. Illustrated in (b) of FIG. 8 is one example of such transmittance characteristics of the first optical filter 5011. As shown in the drawing, the lowest transmittance appears at the optical frequency fx−fk. Therefore, unlike the case shown in (b) of FIG. 7, only one optical frequency is enough to be distinctive. Therefore, the first optical filter 5011 is easier to fabricate.

With such characteristics, when supplied with one optical signal branched by the optical brancher 301 as shown in (a) of FIG. 8, the first optical filter 5011 passes the optical signal while suppressing one of double sideband components of the RF modulated signal Sk, for output from the first output terminal 50011 of the RF optical router 5001. The spectrum of the optical signal outputted from the first output terminal 50011 is illustrated in (c) of FIG. 8.

Similarly, when supplied with the other optical signal branched by the optical brancher 301, the second optical filter 5012 passes the optical signal while suppressing one of double sideband components of the RF modulated signal Sj, for output from the second output terminal 50012 of the RF optical router 5001.

The first optical receiving circuit 50021 is connected to the first output terminal 50011 of the RF optical router 5001, and carries out square-law-detection on the optical signal received therefrom for reproducing and outputting a doubled component Sk of the desired RF modulated signal.

The frequency spectrum of the optical signal outputted from the first optical receiving circuit 50021 is illustrated in (d) of FIG. 8. As shown in the drawing, the RF modulated signal Sk is reproduced at the frequency fk.

As described in the foregoing, in the present optical communications apparatus, in the optical spectrum of the optical signal modulated with the RF modulated signal, switching of the transmission routes is carried out based first on the optical wavelength, and then on the RF modulating frequency. Thus, more address space and subscribers can be ensured. Therefore, the high-speed optical communications apparatus can be so achieved as to cover more subscribers.

In the above, the operation has been described assuming that the apparatus is structured by one optical transmitting circuit and four optical receiving circuits. However, the number of optical receiving circuits is not restrictive, and may be more. As for the optical transmitting circuit, the case where two optical transmitting circuits are included in the optical communications apparatus will be described later. Furthermore, the number of output terminals in the optical router and the RF optical router may be two or more. In other word, the number of optical signals to be extracted by the optical router and the RF optical router for route selection may be two or more.

(Second embodiment)

Figure 9:
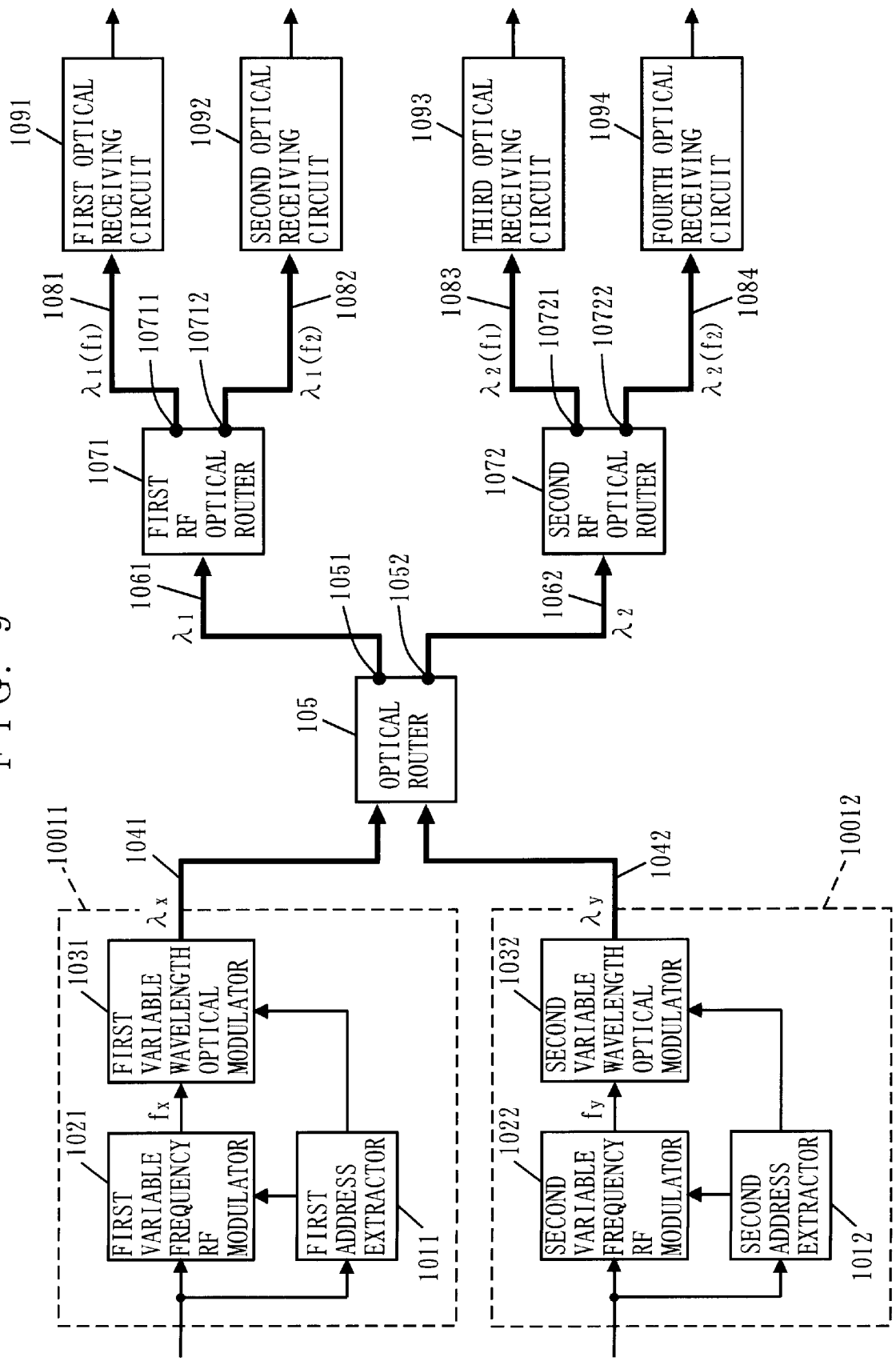
FIG. 9 is a block diagram showing the structure of an optical communications apparatus according to a second embodiment of the present invention.
Figure 10:
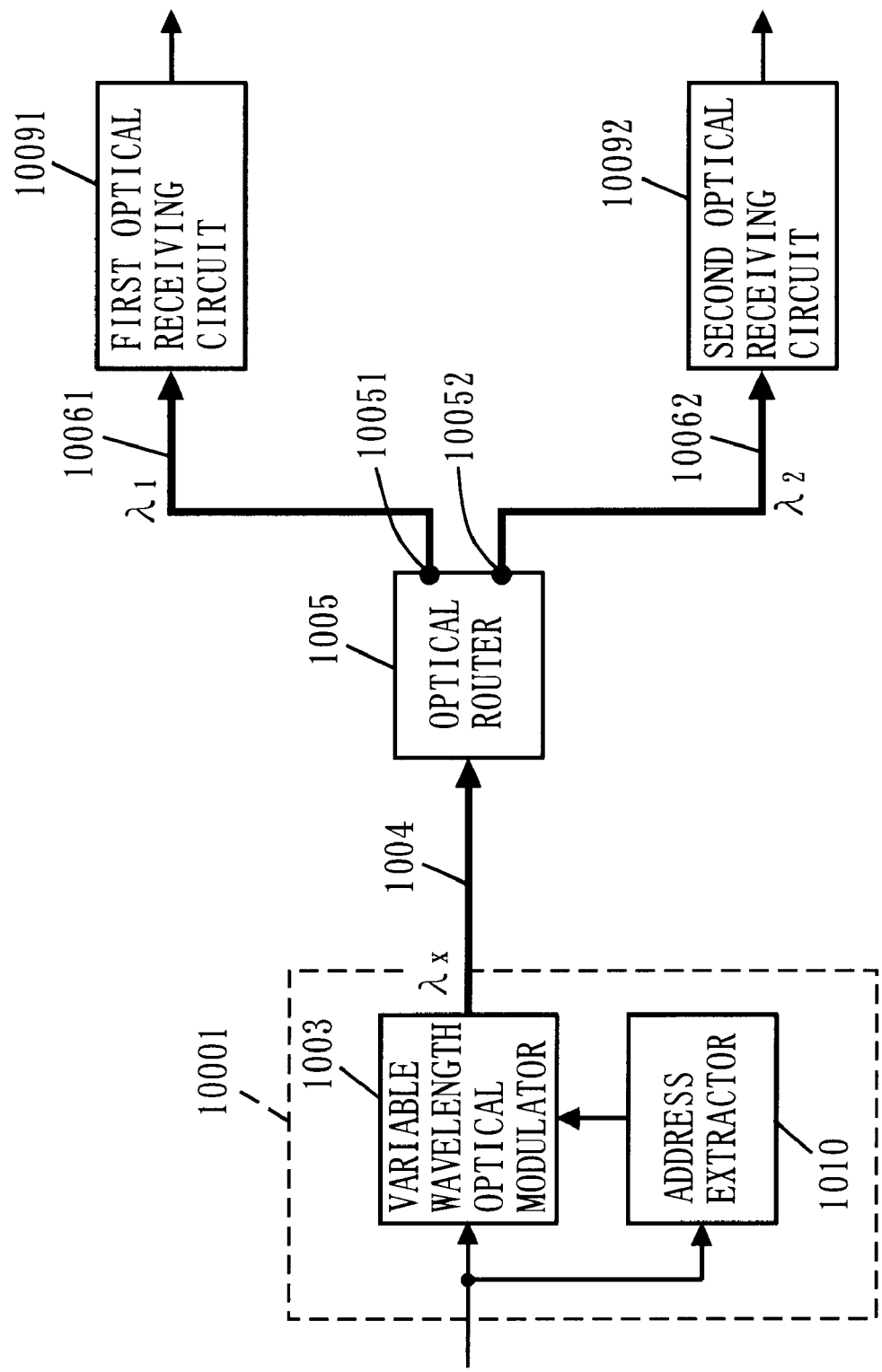
FIG. 10 is a block diagram showing the structure of a conventional optical communications apparatus.
Figure 11:
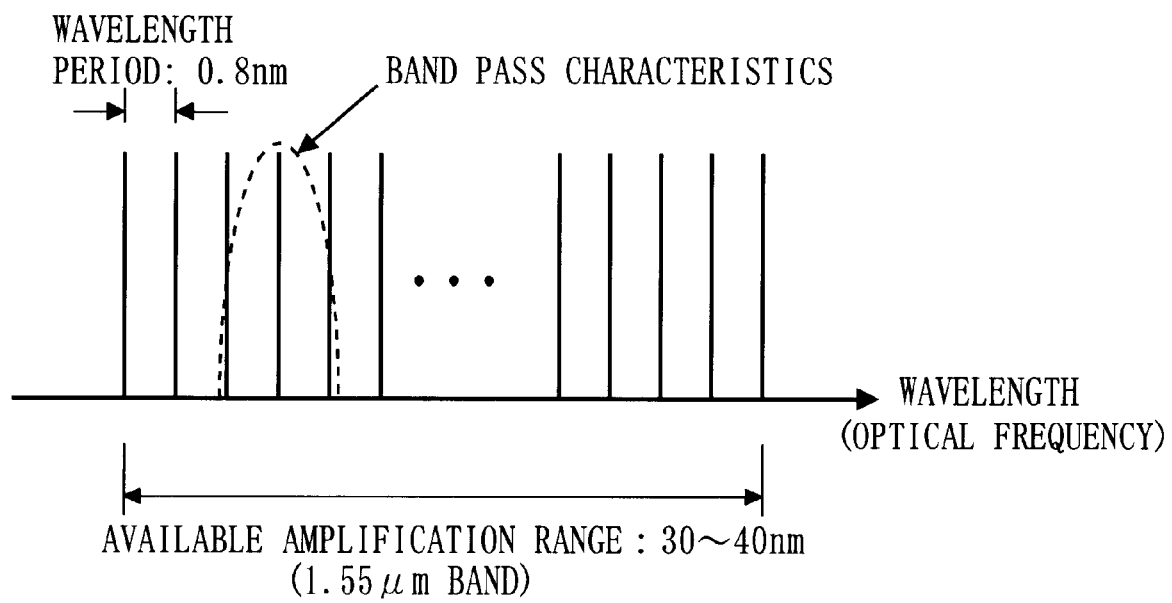
FIG. 11 is a schematic diagram demonstrating limitations of the number of wavelengths in the conventional optical communications apparatus.

With reference to FIG. 9, an optical communications apparatus according to a second embodiment of the present invention is described below. In FIG. 9, the optical communications apparatus realizes communications between two transmitting circuits and four main optical receiving circuits.

Specifically, the optical communications apparatus includes first and second optical transmitting circuits 10011 and 10012; first and second main optical transmission paths 1041 and 1042; an optical router 105; first and second distribution optical transmission paths 1061 and 1062; first and second RF optical routers 1071 and 1072; first, second, third, and fourth end optical transmission paths 1081, 1082, 1083, and 1084; and first, second, third, and fourth optical receiving circuits.

Furthermore, the first optical transmitting circuit 10011 includes a first address extractor 1011, a first variable frequency RF modulator 1021, and a first variable wavelength optical modulator 1031. The second optical transmitting circuit 10012 includes a second address extractor 1012, a second variable frequency RF modulator 1022, and a second variable wavelength optical modulator 1032.

Next, the operation of the optical communications apparatus is described. The optical communications apparatus according to the second embodiment is similar to that according to the first embodiment. Therefore, in the present embodiment, blocks similar to those according to the first embodiment are each provided with the same reference numeral, and not described herein. Mainly described below is the difference therebetween.

In FIG. 9, the first optical transmitting circuit 10011 converts an RF modulated signal supplied by the first variable frequency RF modulator 1021 into an optical modulated signal having a wavelength λx, and sends out to the first main optical transmission path 1041. Similarly, the second optical transmitting circuit 10012 converts an RF modulated signal supplied by the second variable frequency RF modulator 1022 into an optical modulated signal having a wavelength λy, and sends out to the second main optical transmission path 1042.

Here, different information cannot be simultaneously sent to the same destination. Therefore, at one point in time, the wavelength λx of the optical signal outputted from the first optical transmitting circuit 10011 has to be different from the wavelength λy of the optical signal outputted from the second optical transmitting circuit 10012. Also, the frequency fa of the RF modulated signal outputted from the first variable frequency RF modulator 1021 has to be different from the frequency fb of the RF modulated signal outputted from the second variable frequency RF modulator 1022. Therefore, to control the wavelengths and frequencies as such, a controller (not shown) may be provided to the optical communications apparatus.

The optical router 105 multiplexes the optical signals outputted from the first and second optical transmitting circuits 10011 and 10012. Also, when the optical wavelength of the multiplexed signal is the first wavelength λx, the optical router 105 outputs the signal from the first output terminal to the first optical transmission path 1061. On the other hand, when the optical wavelength is the second wavelength λy, the optical router 105 outputs the signal from the second output terminal to the second distribution optical transmission path 1062.

Note that the first and second RF optical routers 1071 and 1072 and the first to fourth optical receiving circuits 1091 to 1094 are similar in structure to those of the first to fourth examples of structure according to the first embodiment.

As described in the foregoing, in the present optical communications apparatus, optical signals from a plurality of optical transmitting circuits are first multiplexed. Then, in the optical spectrum of the optical signal modulated with the RF modulated signal, switching of the transmission routes is carried out based first on the optical wavelength, and then on the RF modulating frequency. Thus, optical transmission paths can be more efficiently used, and a high-speed, large-capacity optical communications apparatus can be achieved.

In the above, the operation has been described assuming that the apparatus is structured by two optical transmitting circuits and four optical receiving circuits. However, the number of optical transmitting circuits and the number of optical receiving circuits are not restrictive, and may be more. Furthermore, the number of output terminals in the optical router and the RF optical router may be two or more. In other word, the number of optical signals to be extracted by the optical router and the RF optical router for route selection may be two or more.

While the invention has been described in detail, the foregoing description is in all aspects illustrative and not restrictive. It is understood that numerous other modifications and variations can be devised without departing from the scope of the invention.

What is claimed is:

1. An optical communications apparatus for optically transmitting a transmission signal including data to a destination, comprising:

a variable frequency RF modulator for modulating said transmission signal into an RF modulated signal, with a predetermined carrier frequency that corresponds to a lower address of address information uniquely set to said destination, said lower address representing said destination in a predetermined group to which said destination belongs;

a variable wavelength optical modulator for modulating said RF modulated signal outputted from said variable frequency RF modulator into an optical signal, with a predetermined optical wavelength that corresponds to an upper address of said address information, said upper address representing said predetermined group to which said destination belongs;

an optical router provided with a plurality of output terminals, for selectively outputting the optical signal outputted from said variable wavelength optical modulator from one of the output terminals that corresponds to the wavelength of the optical signal;

a plurality of RF optical routers each provided with a plurality of output terminals, for selectively outputting the optical signal coming from the output terminal of said optical router from one of the output terminals that corresponds to the carrier frequency of said RF modulated signal on the optical signal; and a plurality of optical receivers each for converting the optical signal outputted from the corresponding output terminal of said RF optical router into an electrical signal that corresponds to said transmission signal.

2. The optical communications apparatus according to claim 1, further comprising:

an address extractor for extracting said address information from the transmission signal including said address information, and outputting said lower address to said variable frequency RF modulator and said upper address to said variable wavelength optical modulator.

3. The optical communications apparatus according to claim 1, wherein said variable frequency RF modulator is plurally provided, each converting the transmission signal to a different destination into said RF modulated signal with different carrier frequency, said variable wavelength optical modulator is plurally provided, each converting said RF modulated signal outputted from the corresponding variable frequency RF modulator into the optical signal, and said optical router is supplied with the optical signals from all variable wavelength optical modulators as being multiplexed.

4. The optical communications apparatus according to claim 1, wherein said variable wavelength optical modulator carries out optical intensity modulation, said variable frequency RF modulator carries out ASK (Amplitude Shift Keying) modulation, each of said RF optical routers includes:
an optical brancher for outputting the optical signal from a plurality of output terminals; and
a plurality of optical modulators each for subjecting the optical signal outputted from the corresponding output terminal of said optical brancher to optical intensity modulation with a signal having a frequency equal to the predetermined carrier frequency of said RF modulated signal, and each of said optical receivers includes:
a square-law-detector for carrying out square-law-detection on the optical signal outputted from said corresponding RF optical router, and outputting an electrical signal; and
a filter for passing a predetermined low frequency component of the electrical signal outputted from said square-law-detector, and outputting baseband information of said RF modulated signal.

5. The optical communications apparatus according to claim 1, wherein said variable wavelength optical modulator carries out optical intensity modulation, each of said RF optical routers includes:
an optical brancher for outputting the optical signal from a plurality of output terminals; and
a plurality of optical filters each for extracting, from the optical signal outputted from the corresponding output terminal of said optical brancher, an optical carrier component and double sideband components corresponding to the predetermined frequency of said RF modulated signal, and each of said optical receivers includes:
a square-law-detector for carrying out square-law-detection on the optical signal outputted from said corresponding RF optical router, and outputting said predetermined RF modulated signal.

6. The optical communications apparatus according to claim 1, wherein said variable wavelength optical modulator carries out optical intensity modulation, each of said RF optical routers includes:
an optical brancher for outputting the optical signal from a plurality of output terminals; and
a plurality of optical filters each for extracting, from the optical signal outputted from the corresponding output terminal of said optical brancher, double sideband components corresponding to the predetermined frequency of said RF modulated signal, and each of said optical receivers includes:
a square-law-detector for carrying out square-law-detection on the optical signal outputted from said corresponding RF optical router, and outputting a signal component that is a multiplied component of said RF modulated signal.

7. The optical communications apparatus according to claim 1, wherein said variable wavelength optical modulator carries out optical frequency modulation, each of said RF optical routers includes:
an optical brancher for outputting the optical signal from a plurality of output terminals; and
a plurality of optical filters each for suppressing, on the optical signal outputted from the corresponding output terminal of said optical brancher, any one of an upper sideband component and a lower sideband component corresponding to the predetermined frequency of said RF modulated signal, and each of said optical receivers includes:
a square-law-detector for carrying out square-law-detection on the optical signal outputted from said corresponding RF optical router, and outputting said RF modulated signal.

8. An optical communications method for optically transmitting a transmission signal including data information to a destination, comprising:

a variable frequency RF modulating step of modulating said transmission signal into an RF modulated signal with a predetermined carrier frequency that uniquely corresponds to said destination in a predetermined group to which said destination belongs;

a variable wavelength optical modulating step of modulating said RF modulated signal outputted from said variable frequency RF modulator into an optical signal with a predetermined optical wavelength that uniquely corresponds to said predetermined group to which said destination belongs;

an optical routing step of selecting a distribution route corresponding to the wavelength of the optical signal converted in said variable wavelength optical modulating step, and outputting the optical signal to the distribution route;

an RF optical routing step of selecting an end route corresponding to the carrier frequency of said RF modulated signal of the optical signal outputted in said optical routing step, and outputting the optical signal to the end route; and an optical receiving step of converting the optical signal outputted in said RF optical routing step into an electrical signal that corresponds to said transmission signal.

* * * * *